(12) United States Patent
Sadik

(10) Patent No.: US 12,396,453 B2
(45) Date of Patent: Aug. 26, 2025

(54) WET PRESERVATION OF TISSUE

(71) Applicant: Axogen Corporation, Alachua, FL (US)

(72) Inventor: Mindy E. Sadik, Gainesville, FL (US)

(73) Assignee: Axogen Corporation, Alachua, FL (US)

( * ) Notice: Subject to any disclaimer, the term of this patent is extended or adjusted under 35 U.S.C. 154(b) by 0 days.

(21) Appl. No.: 18/351,804

(22) Filed: Jul. 13, 2023

(65) Prior Publication Data

US 2024/0180146 A1 Jun. 6, 2024

Related U.S. Application Data

(63) Continuation of application No. 16/898,224, filed on Jun. 10, 2020, now Pat. No. 11,737,451.

(60) Provisional application No. 62/860,019, filed on Jun. 11, 2019.

(51) Int. Cl.
*A01N 1/122* (2025.01)
(52) U.S. Cl.
CPC .................................... *A01N 1/122* (2025.01)
(58) Field of Classification Search
None
See application file for complete search history.

(56) References Cited

U.S. PATENT DOCUMENTS

| | | | |
|---|---|---|---|
| 5,879,876 | A | 3/1999 | Wolfinbarger, Jr. et al. |
| 6,054,317 | A | 4/2000 | McMahon |
| 8,642,255 | B2 | 2/2014 | Nicoud et al. |
| 9,572,911 | B2 | 2/2017 | Muir |
| 2002/0102239 | A1 | 8/2002 | Koopmans et al. |
| 2010/0216110 | A1 | 8/2010 | Brockbank |
| 2011/0008763 | A1 | 1/2011 | Lee |
| 2011/0293576 | A1 | 12/2011 | Lange et al. |
| 2015/0037436 | A1 | 2/2015 | Huang et al. |
| 2020/0000086 | A1 | 1/2020 | Lovick |

FOREIGN PATENT DOCUMENTS

| | | |
|---|---|---|
| CN | 1220824 A | 6/1999 |
| CN | 102482641 A | 5/2012 |
| CN | 107683850 A | 2/2018 |
| JP | 201761531 A | 3/2017 |
| WO | 2007058308 A1 | 5/2007 |
| WO | 2017188061 A1 | 11/2017 |
| WO | 2018064976 A1 | 4/2018 |
| WO | 2018065491 A1 | 4/2018 |
| WO | 2018084228 A1 | 5/2018 |

OTHER PUBLICATIONS

Dequach et al., Tissue Engineering: Part A, vol. 17, No. 21 and 22, 2011, pp. 2583-2592 (Year: 2011).*
Kurokura et al., "Cryopreservation of carp sperm," Aquaculture, vol. 37 (1984), pp. 267-273.
Babiak et al., "Cryopreservation of sperm of common carp, *Cyprinus* L.," Aquaculture Research, 1997, vol. 28, pp. 567-571.
Dictionary.com: definition of configure, retrieved from the internet Jan. 31, 2023: https://www.dictionary.com/browse/configure (Year: 2023).
Negishi et al., "Cryopreservation of Brain Tissue for Primary Culture," Exp. Anim. 51(4), 383-390, 2002.
"Dulbecco's Phosphate Buffered Saline (DPBS)," R&D Systems a biotechne brand, 2 pages, https://resources.mndsystems.com/pdfs/datasheets/B30050.pdf (Year: 2020).
Hudson et al., Tissue Engineering, vol. 10, No. 11/12, 2004, pp. 1641-1651 (Year: 2004).
Jerrolynn C. Kawamoto et at., "Cryopreservation of Primary Neurons for Tissue Culture," Brain Research, vol. 384, pp. 84-93 (1986).
Baxter Healthcare Ltd., "Ringers Solution for Infusion," Updated Mar. 13, 2017.
Baxter Healthcare Corporation, "Plasma-Lyte A Injection pH 7.4 (Multiple Electrolytes Injection, Type 1, USP) in VIAFLEX Plastic Container," Rev. Aug. 2019.
F.K. Sanders et al., "The Degeneration and Re-Innvervation of Grafted Nerves," Journal of Anatomy, vol. 76, Part 2 (1942): 143-166.
Xinyu Zhao et al., "Neural stem cells: developmental mechanisms and disease modeling," Cell and Tissue Research (2018) 371(1): pp. 1-6. doi: 10.1007/s00441-017-2738-1.
University College London Culture Online—UCL, 2 pages, retrieved from the internet Mar. 10, 2022: https://www.ucl.ac.uk/culture-online/ ask-expert/your-questions-answered/are-cells-state-matter#:-: text=For%20many%20years%2C%20it%20was,as% 20the% 20nucleus%20and%20mitochondria (Year: 2022).

(Continued)

*Primary Examiner* — Evelyn Y Pyla
(74) *Attorney, Agent, or Firm* — Bookoff McAndrews, PLLC

(57) ABSTRACT

A system and method are provided for wet storage of tissue. In an embodiment, a solution for the wet preservation of tissue may include between about 0.1% to about 50% by volume dimethyl sulfoxide (DMSO) and one or more soluble monovalent or divalent metal cationic salts. A wet-preserved tissue and method for preparing the wet-preserved tissue for ultimate use, is also provided.

30 Claims, No Drawings

(56) References Cited

OTHER PUBLICATIONS

Cambridge English Dictionary (definition of "Solid", Dictionary.Cambridge.Org, 14 pages, retrieved from the internet Mar. 10, 2022: https://dictionary.cambridge.org/US/dictionary/english/solid (Year: 2022).

Baxter Healthcare, Plasma-Lyte A Injection pH 7.4, retrieved from the internet (Jan. 6, 2022): https://www.baxterpi.com/pi-pdf/PlasmaLyte+A_Injection_ +Viaflex_ +PI.pdf (Year: 2022).

Day et al., Tissue Engineering: Part C, vol. 23, No. 10, 2017, pp. 575-582 (Year: 2017).

Rieder et al., Circulation, 2005; 111 :2792-2797 (Year: 2005).

Li et al., Biology of Reproduction 83, 852-858 (2010) (Year: 2010).

Dictionary.com, definition of Wet, retreived from the internet Apr. 20, 2021: https://www.diclionary.com/browse/wet (Year: 2021).

International Search Report and Written Opinion for International Application No. PCT/US2020/037056, mailed Sep. 2, 2020 (13 pages).

Huang et al., Neural Regeneration Research, vol. 13, Iss. 9, (Sep. 2018): 1643-1649 (Year: 2018).

Millipore Sigma, RPMI-1640 Media Formulation, retrieved from the internet Dec. 16, 2020; https://www.sigmaaldrich.com/life-science/ cell-culture/learning-center/media-formulations/rpmi-1640.html (Year: 2020).

SP Scientific (2019), Effective Removal of DMSO from Stored Samples, retrieved from the internet: https://purvis3.ssl.subhub.com/ articles/Effective-Removal-DMSO-Stored-Samples/print (Year: 2019).

Yi et al., "Scaffolds for peripheral nerve repair and reconstruction," Experimental Neurology, 2019, vol. 319: p. 112761.

"Peripheral Nerve Injury," Johns Hopkins Medicine, available at https://www.hopkinsmedicine.org/health/conditions-and-diseases/peripheral-nerve-injury.

Uemura et al., "Effects of DMSO on Morphological Changes and Viability of Neuron-like Cells Adhered to a Substrate After Freezing and Thawing," Abstracts of the 59th Annual Meeting and Seminar of the Society for Low Temperature Biology and Engineering, 2014, p. 14, B6.

\* cited by examiner

WET PRESERVATION OF TISSUE

CROSS-REFERENCE TO RELATED APPLICATIONS

This patent application is a continuation of U.S. patent application Ser. No. 16/898,224, filed on Jun. 10, 2020, which claims the benefit of priority to U.S. Provisional Patent Application No. 62/860,019, filed on Jun. 11, 2019, the entireties of which are incorporated herein by reference.

TECHNICAL FIELD

The present disclosure generally relates to the preservation of tissue, and more particularly relates to the preservation of tissue using a liquid medium.

BACKGROUND

Biological tissues may often provide improved functional performance as compared to equivalent synthetic devices when used in in vivo implantation. However, the availability and usage of tissue grafts may be restricted by inherent supply constraints and logistic concerns of harvest, transportation, and storage. Various techniques have been developed that allow for the harvesting, delivery, and storage of tissues that may be suitable for use in clinical implantation. However, many of the developed techniques may require the use of specialized refrigeration equipment for storing and shipping the donor tissue at extremely low temperatures, e.g., less than 40 degrees C., and, more particularly, −80 degrees C. Such requirements may frequently restrict the facilities that are able to make use of the available tissues, and may complicate the transportation of tissue to end-use clinical facilities. It is also often more desirable to be able to work with wet-preserved tissue, than dry-preserved tissue which requires added steps and pre-operation prep time, including for rehydration of the dried tissue. Some implementations consistent with the present disclosure may overcome and/or reduce such problems to provide a more readily usable wet-preserved tissue.

SUMMARY

According to an implementation, a solution for the wet preservation of tissue may include between about 0.1% to about 50% by volume dimethyl sulfoxide (DMSO). The solution may also include one or more soluble salts of sodium, potassium, calcium, magnesium or other monovalent or divalent metal cationic salts.

One or more of the following features may be included. The solution may include between about 2% to about 15% by volume DMSO. The solution may include greater than about 2% by volume DMSO. The solution may include greater than about 5% by volume DMSO. The solution may include greater than about 10% by volume DMSO.

The one or more soluble salts may provide one or more of between about 43 mM and about 2.6 M sodium cation, about 2.57 M sodium cation, between about 2.7 mM and about 5.4 mM potassium cation, between about 0.9 mM and about 2.7 mM calcium cation, and/or between about 0.945 mM and about 1.2 mM magnesium cation. The one or more soluble salts of sodium may include between about 2.5 g/L to about 150 g/L sodium chloride. The one or more soluble salts of potassium may include between about 0.2 g/L to about 0.4 g/L potassium chloride. The one or more soluble salts of calcium may include between about 0.1 g/L to about 0.3 g/L calcium chloride. The one or more soluble salts of magnesium may include between about 0.09 to about 0.11 g/L magnesium chloride. The one or more soluble salts of sodium may include between about 0.2 to about 0.8 g/L sodium bicarbonate.

The solution may include between about 2% to about 15% DMSO by volume. The one or more soluble salts provide one or more of between about 43 mM and about 2.6 M sodium cation, between about 2.7 mM and about 5.4 mM potassium cation, between about 0.9 mM and about 2.7 mM calcium cation, and/or between about 0.945 mM and about 1.2 mM magnesium cation.

According to another implementation, a method of preserving tissue may include preparing a specimen of tissue. The specimen of tissue may be stored in a solution including between about 0.1% to about 50% by volume DMSO. The solution may also include one or more soluble salts of: sodium, potassium, calcium, magnesium, or other monovalent or divalent metal cationic salts, particularly of alkali metal and alkaline earth metal cations.

One or more of the following features may be included. The specimen of tissue may be nerve tissue. The nerve tissue may be one of human allograft nerve tissue and/or animal nerve tissue. The specimen of tissue may include one or more of human vascular tissue, urological tissue, tendons, and muscle tissue. The specimen of tissue may include one or more of animal vascular tissue, urological tissue, tendons, and muscle tissue. Preparing the specimen of tissue may include decellularizing the tissue.

The solution may include between about 2% to about 15% by volume DMSO. The solution may include greater than about 2% by volume DMSO. The solution may include greater than about 5% by volume DMSO. The solution may include greater than about 10% by volume DMSO.

The one or more soluble salts may provide one or more of between about 43 mM and about 2.6 M sodium cation, between about 2.7 mM and about 5.4 mM potassium cation, between about 0.9 mM and about 2.7 mM calcium cation, and/or between about 0.945 mM and about 1.2 mM magnesium cation. The one or more soluble salts of sodium may include between about 2.5 g/L and about 150 g/L sodium chloride. The one or more soluble salts of potassium may include between about 0.2 g/L to about 0.4 g/L potassium chloride. The one or more soluble salts of calcium may include between about 0.1 g/L to about 0.3 g/L calcium chloride. The one or more soluble salts of magnesium may include between about 0.09 to about 0.11 g/L magnesium chloride. The one or more soluble salts of sodium may include between about 0.2 g/L to about 0.8 g/L sodium bicarbonate.

The solution may include between about 2% to about 15% DMSO by volume. The one or more soluble salts may provide one or more of between about 43 mM and about 2.6 M sodium cation, between about 2.7 mM and about 5.4 mM potassium cation, between about 0.9 mM and about 2.7 mM calcium cation, and/or between about 0.945 mM and about 1.2 mM magnesium cation.

According to another implementation, a wet-preserved tissue may include a tissue specimen disposed in a solution including between about 0.1% to about 50% by volume DMSO. The solution may also include one or more soluble salts. The one or more soluble salts may provide one or more of between about 43 mM and about 2.6 M sodium cation, between about 2.7 mM and about 5.4 mM potassium cation, between about 0.9 mM and about 2.7 mM calcium cation, and/or between about 0.945 mM and about 1.2 mM magnesium cation.

One or more of the following features may be included. The one or more soluble salts may include one or more of between about 2.5 g/L to about 150 g/L sodium chloride, between about 0.2 g/L to about 0.4 g/L potassium chloride, between about 0.1 g/L to about 0.3 g/L calcium chloride, between about 0.2 g/L to about 0.8 g/L sodium bicarbonate, and/or between about 0.09 g/L to about 0.11 g/L magnesium chloride.

The specimen of tissue may be nerve tissue. The nerve tissue may be one of human nerve tissue and/or animal nerve tissue. The specimen of tissue may include one or more of human vascular tissue, urological tissue, tendons, and/or muscle tissue. The specimen of tissue may include one or more of animal vascular tissue, urological tissue, tendons, and/or muscle tissue. Preparing the specimen of tissue may include decellularizing the tissue. The wet-preserved tissue specimen may ultimately be implanted in a human or in an animal.

The solution may include between about 2% to about 15% by volume DMSO. The solution may include greater than about 2% by volume DMSO. The solution may include greater than about 5% by volume DMSO. The solution may include greater than about 10% by volume DMSO. The tissue may be at least partially immersed in the solution.

According to another implementation, a method of using a wet-preserved tissue specimen may include removing the specimen of tissue which had been disposed in a solution including between about 0.1% to about 50% by volume DMSO. The solution may also include one or more soluble salts. The one or more soluble salts may provide one or more of between about 43 mM and about 2.6 M sodium cation, between about 2.7 mM and about 5.4 mM potassium cation, between about 0.9 mM and about 2.7 mM calcium cation, and/or between about 0.945 mM and about 1.2 mM magnesium cation. The method may also include reducing the amount of DMSO within the tissue to a residual amount below a predetermined threshold.

One or more of the following features may be included. The one or more soluble salts may include one or more of between about 2.5 g/L to about 150 g/L sodium chloride, between about 0.2 g/L to about 0.4 g/L potassium chloride, between about 0.1 g/L to about 0.3 g/L calcium chloride, between about 0.2 g/L to about 0.8 g/L sodium bicarbonate, and/or between about 0.09 g/L to about 0.11 g/L magnesium chloride.

The specimen of tissue may be nerve tissue. The nerve tissue may be one of human nerve tissue and/or animal nerve tissue. The specimen of tissue may include one or more of human vascular tissue, urological tissue, tendons, and/or muscle tissue. The specimen of tissue may include one or more of animal vascular tissue, urological tissue, tendons, and/or muscle tissue. Preparing the specimen of tissue may include decellularizing the tissue.

The solution may include between about 2% to about 15% by volume DMSO. The solution may include greater than about 2% by volume DMSO. The solution may include greater than about 5% by volume DMSO. The solution may include greater than about 10% by volume DMSO.

While the amount of DMSO within the tissue, as packaged, may exceed 50 mg, the residual amount of DMSO within the tissue may be at or below about 50 mg prior to implantation.

DETAILED DESCRIPTION OF EXAMPLE EMBODIMENTS

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The relative term "about," is used to indicate a possible variation of ±10% of a stated or understood value. In addition, the term "between" used in describing ranges of values is intended to include the minimum and maximum values described herein.

In general, embodiments consistent with the present disclosure may relate to systems and methods for preserving tissue. For example, the disclosed systems and methods may allow tissue specimens to be preserved while maintaining structural integrity and/or functional stability of the tissue. In some implementations, maintaining the structural integrity and/or functional stability of the tissue may allow successful in vivo implantation of the tissue. Consistent with example embodiments, a tissue specimen to be preserved may be stored in a solution including less than about 50% DMSO and a selection of mono and/or divalent cations and/or salts. In some implementations, storage of tissue specimens in solutions described herein may allow for prolonged room temperature storage, and/or storage at common refrigeration temperatures, of tissue while maintaining structural integrity and/or functional stability of the tissue.

Consistent with the present disclosure a variety of tissue types may be preserved. For example, according to an illustrative example embodiment, the disclosed systems and methods may be utilized for preserving nerve tissue, e.g., which may be subsequently used for in vivo implantation (and/or any other suitable use). In various additional and/or alternative embodiments, the disclosed systems and methods may be utilized for preserving other tissues, including, but not limited to, vascular tissue, urological tissue (e.g., bladder wall, ureter tissue, urethra tissue), skeletal tissue (e.g., bone, cartilage, ligaments, fascia, tendons), muscle tissue (e.g., striated and/or smooth muscle tissue), skin, dura, myocardium, neural tissue, intestine, gingiva, and the like. In some example embodiments, the tissue may include harvested human nerve allograft tissue, e.g., which may be intended for use in clinical repair and/or restoration procedures. It will be appreciated that, in addition and/or as an alternative to human nerve allograft tissue, the systems and methods herein may also be utilized in connection with animal nerve tissue, as well as various other human and/or animal tissues. According to an illustrative example, animal tissue, whether nerve tissue or another type of tissue, may include tissue from a ruminant.

In some implementations, a tissue specimen may be prepared for preservation through a variety of processes that may isolate one or more specific tissue types based upon, for example, an intended end use of the tissue. For example, in an illustrative example embodiment in which the tissue may include nerve tissue intended for in vivo implantation. In such an embodiment, the tissue may be harvested from a donor (such as a cadaver), and may be cleaned and processed to isolate the desired tissue. In an example embodiment, harvested human nerve tissue may be cleaned (e.g., to remove fat and/or other extraneous, non-nerve tissue and components, including antigens). Further, the harvested nerve tissue may undergo various chemical and enzymatic processes to decellularize the tissue. It will be appreciated that a variety of processes may be utilized to clean and decellularize the tissue specimens, and, as such, the present disclosure is not intended to be limited to any specific preparation process. One suitable illustrative methodology for preparing a tissue specimen for preservation is described in U.S. Pat. No. 9,572,911, entitled "Method for Decellularization of Tissue Grafts," the entire disclosure of which is incorporated herein by reference. It will be appreciated, however, that various other methods for preparing tissue specimens may be used.

Once a tissue specimen has been prepared for storage in a desired manner (e.g., via cleaning and/or decellularization and/or any other processing steps), the tissue specimen may be disposed in a preservation solution that may permit extended storage of the tissue, while maintaining the structural integrity and/or functional stability of the tissue. In general, the present disclosure may provide a wet storage approach, whereby the tissue may be disposed in the preservation solution for the duration of the tissue storage. In some implementations, the tissue may be disposed in the preservation solution for the duration of the tissue storage by packaging the tissue in a reservoir (e.g., which may include any suitable liquid containment vessel) that may be at least partially filled with the preservation solution. Consistent with such an implementation, the tissue disposed in the preservation solution may remain at least partially immersed in the preservation solution for the duration of the tissue storage. In some implementations, the tissue may be disposed in the preservation solution by saturating the tissue with the preservation solution. The tissue saturated with the preservation solution may then be sealed in a suitable packaging arrangement that may prevent and/or reduce the rate of drying of the tissue during storage. In such an implementation, the saturated tissue may be disposed in the preservation solution, but the packaging may include relatively little, or no, free preservation solution outside of saturated tissue itself (e.g., as compared to an embodiment in which the tissue may be at least partially immersed in preservation solution that may at least partially fill the reservoir and/or other liquid containment vessel). The tissue may be saturated with the preservation solution in any suitable manner, such as by being immersed in the preservation solution for an adequate period of time to achieve a desired level of saturation.

As generally discussed above, consistent with some embodiments, the tissue may be stored in a liquid containment vessel that may retain the tissue in an enclosed volume of the preservation solution. In some embodiments, the volume of preservation solution surrounding the tissue may be minimized. For example, the tissue may be saturated with the preservation solution and subsequently contained in a liquid containment vessel that may provide limited, or no, excess liquid volume surrounding the tissue specimen. It will be appreciated that various implementations utilizing different liquid containment vessels and different retained volumes of preservation solution (e.g., in relation to the size and/or volume of the tissue specimen) may be achieved. Examples of suitable liquid containment vessels may include, but are not limited to, sealed vials, sealed foil pouches, plastic blister packaging with peelable and/or rupturable film or foil seal, or any other suitable liquid containment vessel.

In some implementations, the tissue specimen may be sterilized, e.g., either before or after being placed in the preservation solution. In an example embodiment, the tissue specimen may be sealed in a liquid containment vessel, including the preservation solution, and may subsequently be sterilized using gamma radiation, e.g., in a generally known manner. In some implementations, sterilization via gamma radiation may be carried out at low temperature, e.g., a temperature on the order of −80 degrees C., although such parameters may vary depending upon the exact sterilization process utilized. Further in some embodiments, prior to in vivo implantation, an amount of one or more components of the preservation solution in the tissue specimen, may be reduced to or below a predetermined threshold to provide the desired residual amount of that component in the tissue specimen. For example, in some embodiments the tissue specimen may undergo one or more soaking and/or rinsing processes, with or without agitation, e.g., to decrease the amount of any residual preservation solution to, or below, a desired threshold. Consistent with such an example, at the time of in vivo implantation, the tissue specimen may be removed from the liquid containment vessel, and may be placed in a rinse basin including a suitable rinse solution, such as Lactated Ringers Solution ("LRS"), saline, phosphate buffered saline ("PBS"), or other suitable rinse solution/liquid. In some implementations more than one rinse solution may be utilized and/or more than one soak and/or rinse operation may be performed prior to implantation of the tissue specimen. In some implementations, one or more soak and/or rinse operations may be carried out to decrease the DMSO amount in the tissue specimen to be at or below a desired threshold residual amount. In an illustrative example embodiment, the tissue specimen may be rinsed to reduce the DMSO amount in the tissue specimen to be at or below 50 mg prior to implantation. For example, in an illustrative example rinse protocol, the tissue specimen may be washed for ten minutes with 100 mL of a 0.9% sodium chloride rinse solution (e.g., a normal saline solution) to reduce the DMSO amount to be at or below 50 mg. It will be appreciated that other soak and/or rinse protocols may be utilized to provide a tissue specimen having a different residual amount of DMSO. In some implementations, one or more rinse operations may be carried out to decrease the amount of one or more other components of the preservation solution in the tissue specimen to or below a desired residual threshold amount.

As discussed above, consistent with various embodiments, wet storage of tissue specimens in a preservation solution consistent with the present disclosure may allow prolonged storage of tissue while maintaining structural integrity and/or functional stability of the tissue. For example, decellularized human nerve tissue stored in a preservation solution consistent with the present disclosure has exhibited favorable stability as evaluated using neurite outgrowth bioassay and histological assessment of the endoneurial tube assessment) based on the structure of individual endoneurial tubes within the tissue specimen.

As noted, in some example implementations, structural integrity and functional stability of tissue specimens may be maintained over prolonged storage periods within preservation solutions consistent with the present disclosure. For example, in some implementations, preservation solutions consistent with the present disclosure may be capable of achieving a useful shelf life for stored tissues on the order of about 2 years. It will be appreciated that, depending upon tissue type, storage conditions, and exact solution formulations, longer or shorter useful shelf lives may be achieved. In some implementations, the structural integrity and/or functional stability of tissue specimens may be achieved using preservation solutions herein without the use of extreme low temperature storage. For example, some conventional tissue storage approaches may utilize low temperatures as part of the storage process. For example, some storage processes may utilize storage temperatures on the order of about −80 degrees C. In some embodiments, a preservation solution consistent with the present disclosure may allow prolonged storage of tissue at room temperature, and/or at refrigeration levels achievable with readily available conventional refrigeration systems. Consistent with various embodiments, prolonged storage of tissue may be achieved at temperatures in the range of about 10 degrees C. to about 30 degrees C., and, more particularly, 15 degrees C. to about 30 degrees C., while maintaining structural integrity and/or functional stability of the tissue. According to other implementations, lower or higher storage temperatures may be utilized. The ability to achieve prolonged storage of tissue at such temperatures may be useful for clinical environments that may not have access to specialized refrigeration equipment capable of extremely low storage temperatures. Similarly, the ability to achieve prolonged storage of tissue at such temperatures may facilitate shipment of tissue (e.g., from a production facility that may prepare the tissue specimens to an end-use environment, such as a clinical facility), without the requirement for specialized cold transport.

In an example embodiment, a solution for the wet preservation of tissue may include a DMSO solution in combination with various salts that may, for example, allow for prolonged storage of a tissue specimen while maintaining structural integrity and/or functional stability of the tissue. In an embodiment, the solution may include less than about 50% DMSO by volume of the solution. In some example embodiments the solution may include between about 0.1% to about 50% DMSO by volume. In some example embodiments, the solution may include less than about 15% DMSO by volume. In some implementations, the solution may include greater than about 2% DMSO by volume of the solution. According to other illustrative examples, the solution may include any concentration of DMSO between about 2% to about 15% DMSO by volume of the solution. For example, the solution may include about 5% DMSO by volume of the solution, 10% by volume of the solution, as well as any other incremental value between about 2% to about 15% DMSO by volume of the solution. Further, in various implementations, the solution may include, for example, between about 2% to about 10% DMSO by volume of the solution. In some implementations, the solution may include between about 2% to about 5% DMSO by volume of the solution. In some implementations, the solution may include between about 5% to about 15% DMSO by volume of the solution. In some implementations, the solution may include between about 10% to about 15% DMSO by volume of the solution. In some implementations, the solution may include between about 5% to about 10% DMSO by volume of the solution.

As generally discussed above, the wet preservation solution may include one or more of various monovalent and/or divalent cations and/or salts (e.g., that may provide various monovalent and/or divalent cations in solution). As it is recognized that each of the salts appropriate for this disclosure will dissociate, as used herein, the term "solution" or "wet preservation solution" is therefore used to refer to and include a solution of DMSO and the soluble salts used to form the solution, as well as a solution of DMSO and the independent monovalent and/or divalent cations and/or anions provided from the dissociation of those salts. For example, the solution may include one or more different monovalent and/or divalent metal cations, such as, but not limited to, sodium, potassium, calcium, magnesium, and/or zinc. In one embodiment, the solution may include one or more of sodium chloride, potassium chloride, calcium chloride, sodium bicarbonate, and/or magnesium chloride as contributors of the one or more cations. It will be appreciated that in other embodiments, different salts may be utilized as cation contributors. In an illustrative example, the one or more soluble salts may provide one or more of between about 43 mM and about 2.6 M sodium cation, between about 2.7 mM and about 5.4 mM potassium cation, between about 0.9 mM and about 2.7 mM calcium cation, and/or between about 0.945 mM and about 1.2 mM magnesium cation.

In some illustrative example embodiments, the solution may include between about 2.5 g/L and about 150 g/L sodium chloride. In some example embodiments, the solution may include between about 2.5 g/L and about 12 g/L sodium chloride. In some example embodiments, the solution may include between about 2.5 g/L and about 6 g/L sodium chloride. In some example embodiments, the solution may include between about 6 g/L and about 12 g/L sodium chloride.

In some illustrative example embodiments, the solution may include between about 0.2 g/L to about 0.4 g/L potassium chloride. In an illustrative example embodiment, the solution may include about 0.3 g/L potassium chloride. In some illustrative example embodiments, the solution may include between about 0.1 g/L to about 0.3 g/L calcium chloride. In an illustrative example embodiment, the solution may include about 0.2 g/L calcium chloride. In some illustrative example embodiments, the solution may include between about 0.09 g/L to about 0.11 g/L magnesium chloride. In an illustrative example embodiment, the solution may include about 0.1 g/L magnesium chloride. In some illustrative example embodiments, the solution may include between about 0.2 g/L to about 0.8 g/L sodium bicarbonate. In an illustrative example, the solution may include about 0.4 g/L sodium bicarbonate. In various embodiments, one or more of the foregoing salts and/or cations donated by the foregoing salts, may be omitted from the solution. Further, in some embodiments, one or more additional salts and/or cations may be included.

While some of the foregoing example embodiments have been described in the context of preserving nerve tissue for use in nerve graft applications, it will be appreciated that the principles, features, and/or advantages described herein may be equally applicable to other types of tissues and/or tissues for other intended applications. It will also be appreciated that the solutions, tissues, and preservation methodologies may be susceptible to various modifications, variations, and substitutions. Accordingly, the present disclosure should not be limited by any of the disclosed example embodiments, and should be afforded the full scope of the appended claims.

What is claimed is:

1. A packaged, wet-preserved nerve tissue comprising:
a sealed packaging containing:
the wet-preserved nerve tissue, configured for implantation into a subject; and
an aqueous wet-preservation solution in which the wet-preserved nerve tissue is saturated or at least partially submerged, wherein the packaging defines an enclosed volume of the wet-preservation solution, and the wet-preservation solution comprises:
about 0.1% to about 50% by volume dimethyl sulfoxide (DMSO);
about 2.5 g/L to about 150 g/L sodium chloride; and one or more soluble salts of sodium, potassium, calcium, or magnesium.

2. The packaged, wet-preserved nerve tissue of claim 1, wherein the nerve tissue in the wet-preservation solution is shelf stable at a temperature range of about 10 degrees Celsius to about 30 degrees Celsius.

3. The packaged, wet-preserved nerve tissue of claim 1, wherein the one or more soluble salts comprises at least one of:
about 0.2 g/L to about 0.4 g/L potassium chloride;
about 0.1 g/L to about 0.3 g/L calcium chloride;
about 0.2 g/L to about 0.8 g/L sodium bicarbonate; or
about 0.09 g/L to about 0.11 g/L magnesium chloride.

4. The packaged, wet-preserved nerve tissue of claim 1, wherein the one or more soluble salts comprises a plurality of soluble salts, including:
about 0.2 g/L to about 0.4 g/L potassium chloride;
about 0.1 g/L to about 0.3 g/L calcium chloride;
about 0.2 g/L to about 0.8 g/L sodium bicarbonate; and
about 0.09 g/L to about 0.11 g/L magnesium chloride.

5. The packaged, wet-preserved nerve tissue according to claim 1, wherein the wet-preservation solution comprises about 150 g/L sodium chloride.

6. The packaged, wet-preserved nerve tissue according to claim 1, wherein the wet-preserved nerve tissue is one of a human nerve or an animal nerve.

7. The packaged, wet-preserved nerve tissue according to claim 1, wherein the wet-preserved nerve tissue is decellularized.

8. The packaged, wet-preserved nerve tissue according to claim 1, wherein the wet-preservation solution includes about 2% to about 15% by volume DMSO.

9. The packaged, wet-preserved nerve tissue according to claim 1, wherein the wet-preservation solution includes about 2% to about 50% by volume DMSO.

10. The packaged, wet-preserved nerve tissue according to claim 1, wherein the wet-preservation solution includes about 5% to about 50% by volume DMSO.

11. The packaged, wet-preserved nerve tissue according to claim 1, wherein the wet-preservation solution includes about 10% to about 50% by volume DMSO.

12. The packaged, wet-preserved nerve tissue according to claim 1, wherein the wet-preserved nerve tissue in the wet-preservation solution is shelf stable for about 2 years.

13. The packaged, wet-preserved nerve tissue according to claim 1, wherein the packaging is one or more of a sealed: vial, foil pouch, or blister packaging.

14. A packaged, wet-preserved nerve tissue comprising:
a sealed packaging containing:
the wet-preserved nerve tissue, configured for implantation into a subject; and
an aqueous wet-preservation solution in which the wet-preserved nerve tissue is saturated or at least partially submerged, wherein the packaging defines an enclosed volume of the wet-preservation solution, and the aqueous wet-preservation solution comprises:
about 0.1% to about 50% by volume dimethyl sulfoxide (DMSO);
sodium chloride that provides about 43 mM to about 2.6 M sodium cation; and
one or more soluble salts of sodium, potassium, calcium, or magnesium, wherein the one or more soluble salts provide one or more of:
about 2.7 mM to about 5.4 mM potassium cation,
about 0.9 mM to about 2.7 mM calcium cation, or
about 0.945 mM to about 1.2 mM magnesium cation,
wherein the wet-preserved nerve tissue in the aqueous wet-preservation solution is shelf stable at a temperature range of about 10 degrees Celsius to about 30 degrees Celsius.

15. The packaged, wet-preserved nerve tissue according to claim 14, wherein the aqueous wet-preservation solution further comprises sodium bicarbonate.

16. The packaged, wet-preserved nerve tissue according to claim 14, wherein the aqueous wet-preservation solution comprises:
about 150 g/L sodium chloride;
potassium chloride;
calcium chloride;
sodium bicarbonate; and
magnesium chloride.

17. The packaged, wet-preserved nerve tissue according to claim 14, wherein the sodium chloride provides between about 43 mM and about 2.6 M sodium cation, and wherein the one or more soluble salts provide at least:
about 2.7 mM to about 5.4 mM potassium cation,
about 0.9 mM to about 2.7 mM calcium cation, and
about 0.945 mM to about 1.2 mM magnesium cation.

18. The packaged, wet-preserved nerve tissue according to claim 14, wherein the one or more soluble salts provide about 2.6 M sodium cation.

19. The packaged, wet-preserved nerve tissue according to claim 14, wherein the wet-preserved nerve tissue is one of a human nerve or an animal nerve.

20. The packaged, wet-preserved nerve tissue according to claim 14, wherein the wet-preserved nerve tissue is decellularized.

21. The packaged, wet-preserved nerve tissue according to claim 14, wherein the aqueous wet-preservation solution includes about 2% to about 15% by volume DMSO.

22. The packaged, wet-preserved nerve tissue according to claim 14, wherein the aqueous wet-preservation solution includes about 2% to about 50% by volume DMSO.

23. The packaged, wet-preserved nerve tissue according to claim 14, wherein the aqueous wet-preservation solution includes about 5% to about 50% by volume DMSO.

24. The packaged, wet-preserved nerve tissue according to claim 14, wherein the aqueous wet-preservation solution includes about 10% to about 50% by volume DMSO.

25. The packaged, wet-preserved nerve tissue according to claim 14, wherein the wet-preserved nerve tissue in the wet-preservation solution is shelf stable for about 2 years.

26. The packaged, wet-preserved nerve tissue according to claim 14, wherein the packaging is one or more of a sealed: vial, foil pouch, or blister packaging.

27. A packaged, wet-preserved nerve tissue comprising:
a sealed packaging containing:
the wet-preserved nerve tissue, configured for implantation into a subject; and
an aqueous wet-preservation solution in which the wet-preserved nerve tissue is saturated or at least partially submerged, wherein the packaging defines an enclosed volume of the wet-preservation solution, and the wet-preservation solution comprises:
about 0.1% to about 50% by volume dimethyl sulfoxide (DMSO);
a soluble sodium salt that provides about 43 mM to about 2.6 M sodium cation; and
one or more soluble salts of potassium, calcium, or magnesium, wherein the one or more soluble salts provide one or more of:

about 2.7 mM to about 5.4 mM potassium cation, about 0.9 mM to about 2.7 mM calcium cation, or about 0.945 mM to about 1.2 mM magnesium cation, wherein the wet-preserved nerve tissue in the wet-preservation solution is shelf stable at a temperature range of about 10 degrees Celsius to about 30 degrees Celsius.

28. The packaged, wet-preserved nerve tissue of claim 27, wherein the about 43 mM to about 2.6 M sodium cation is provided by at least one of sodium chloride or sodium bicarbonate.

29. The packaged, wet-preserved nerve tissue of claim 27, wherein the soluble sodium salt provides about 2.6 M sodium cation.

30. A packaged, wet-preserved nerve tissue comprising: a sealed packaging containing:

the wet-preserved nerve tissue, configured for implantation into a subject; and an aqueous wet-preservation solution in which the wet-preserved nerve tissue is saturated or at least partially submerged, wherein the packaging defines an enclosed volume of the wet-preservation solution, and the wet-preservation solution comprises:

about 0.1% to about 50% by volume dimethyl sulfoxide (DMSO);

about 2.5 g/L to about 150 g/L of a chloride salt; and one or more other soluble salts of sodium, potassium, calcium, or magnesium, wherein the wet-preserved nerve tissue in the wet-preservation solution is shelf stable at a temperature range of about 10 degrees Celsius to about 30 degrees Celsius.

\* \* \* \* \*